(12) United States Patent
Calvert

(10) Patent No.: US 6,988,426 B2
(45) Date of Patent: Jan. 24, 2006

(54) DUAL RANGE COUNTERSHAFT TRANSMISSION

(75) Inventor: Glen P. Calvert, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/318,380

(22) Filed: Dec. 12, 2002

(65) Prior Publication Data

US 2003/0136208 A1 Jul. 24, 2003

Related U.S. Application Data

(60) Provisional application No. 60/344,976, filed on Dec. 31, 2001.

(51) Int. Cl.
*F16H 3/08* (2006.01)
(52) U.S. Cl. .............................. 74/331; 74/333; 74/745
(58) Field of Classification Search .................. 74/331, 74/333, 745; 475/200
See application file for complete search history.

(56) References Cited

U.S. PATENT DOCUMENTS

| | | | |
|---|---|---|---|
| 2,890,603 A | 6/1959 | Harris et al. | |
| 3,245,504 A | 4/1966 | Wickman | |
| 3,774,475 A | 11/1973 | Meysenburg et al. | |
| 3,858,455 A | 1/1975 | Sisson et al. | |
| 3,916,710 A | 11/1975 | Sisson et al. | |
| 3,916,714 A | 11/1975 | Sisson et al. | |
| 4,245,519 A * | 1/1981 | Herlitzek ...................... | 74/331 |
| 4,318,305 A | 3/1982 | Wetrich et al. | |
| 4,392,391 A * | 7/1983 | Jameson et al. .............. | 74/333 |
| 4,549,443 A | 10/1985 | White | |
| 4,823,639 A | 4/1989 | Krause et al. | |
| 5,249,475 A * | 10/1993 | McAskill ...................... | 74/331 |
| 5,511,437 A * | 4/1996 | Braun ........................ | 74/331 |
| 5,715,727 A * | 2/1998 | Janiszewski ................. | 74/325 |
| 5,743,142 A * | 4/1998 | Leber et al. .................. | 74/331 |
| 5,989,146 A | 11/1999 | Brown et al. | |
| 6,128,974 A * | 10/2000 | Hughes ........................ | 74/745 |
| 6,257,080 B1 * | 7/2001 | Shin ........................... | 74/325 |
| 6,318,211 B1 * | 11/2001 | Nitzschke et al. ............ | 74/745 |
| 6,513,399 B2 * | 2/2003 | Lamela ........................ | 74/331 |

* cited by examiner

*Primary Examiner*—Rodney H. Bonck
*Assistant Examiner*—David D. Le

(57) ABSTRACT

A countershaft transmission includes an input member drivingly connected to a power source and at least one directional clutch assembly structured and arranged to be selectively engageable with the input member. At least one speed clutch assembly is structured and arranged to be selectively engageable with the at least one directional clutch assembly. A dual range assembly is structured and arranged to be selectively engageable with the at least one speed clutch assembly. An output member is selectively engageable with the dual range assembly wherein a rotational speed of the input member is transformed to one of a high range speed or a low range speed of the output member through the dual range assembly.

9 Claims, 2 Drawing Sheets

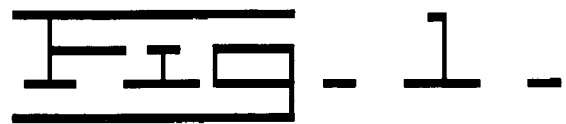
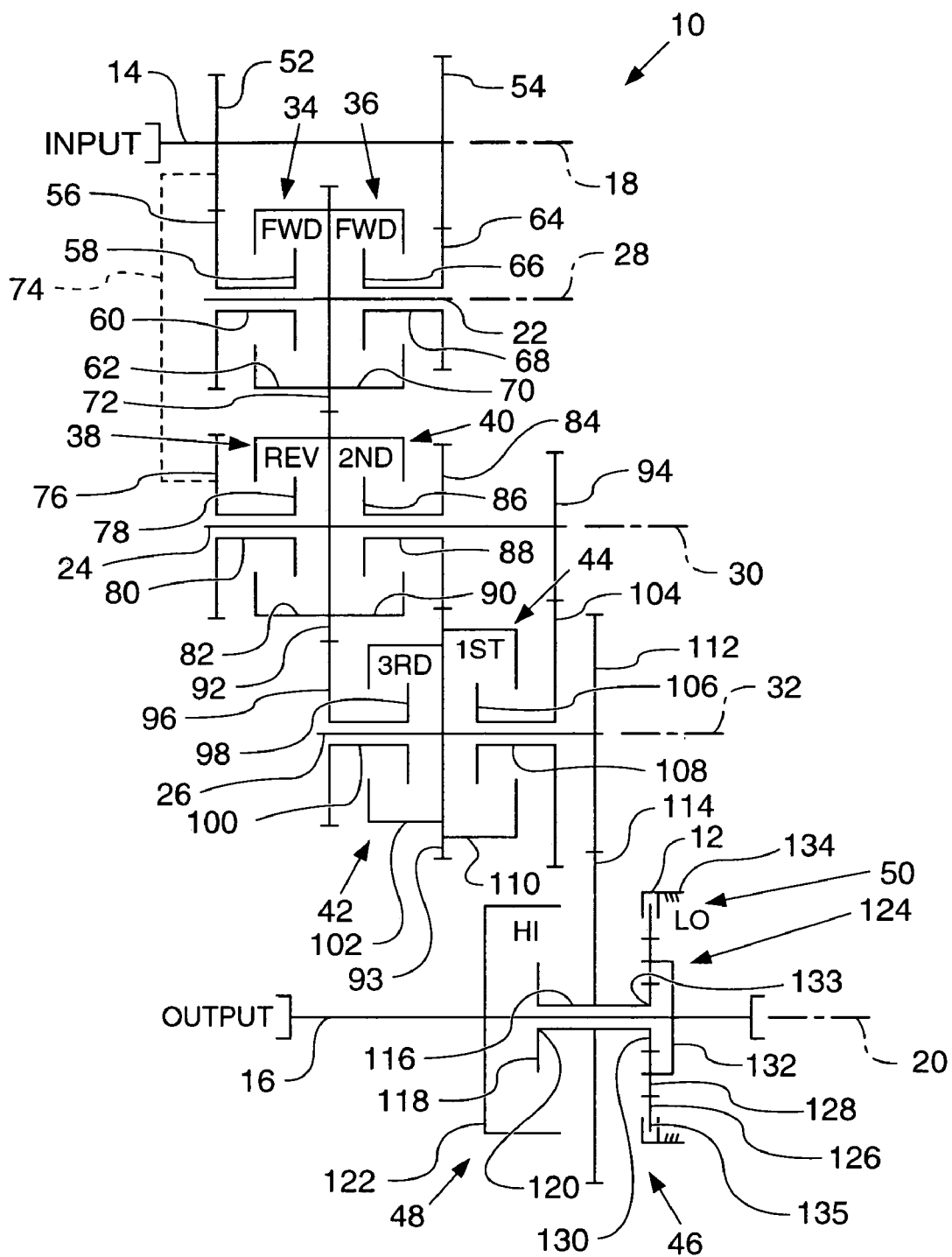

Fig. 2.

|  | SPEED RANGE | | | |
|---|---|---|---|---|
|  | LOW | | HIGH | |
| SPEED SELECTION | CLUTCHES ENGAGED | REDUCTION RATIO | CLUTCHES ENGAGED | REDUCTION RATIO |
| 1F | 34 + 44 + 50 | 18.7 | 34 + 44 + 48 | 5.5 |
| 2F | 34 + 40 + 50 | 9.3 | 34 + 40 + 48 | 2.7 |
| 3F | 34 + 42 + 50 | 5.3 | 34 + 42 + 48 | 1.6 |
| 4F | 36 + 42 + 50 | 2.7 | 36 + 42 + 48 | 0.8 |
|  |  |  |  |  |
| 1R | 38 + 44 + 50 | 18.7 | 38 + 44 + 48 | 5.5 |
| 2R | 38 + 40 + 50 | 9.3 | 38 + 40 + 48 | 2.7 |
| 3R | 38 + 42 + 50 | 5.3 | 38 + 42 + 48 | 1.6 |

DUAL RANGE COUNTERSHAFT TRANSMISSION

This application claims the benefit of prior provisional patent application Ser. No. 60/344,976 filed Dec. 31, 2001.

TECHNICAL FIELD

This invention relates generally to a countershaft transmission for a vehicle or the like, and more particularly to a countershaft transmission having a plurality of forward and reverse speeds using constant mesh gearing and a plurality of fluid actuated, rotating clutches of the interleaved multiple plate and disc type.

BACKGROUND

Countershaft transmissions having a plurality of speed ratios in each direction of operation are particularly useful in the driveline of vehicles such as earthmoving wheel loaders, rubber tired log skidders, track-type tractors, and other off-highway heavy-duty vehicles. Such transmissions are advantageous in that a plurality of rotating clutches and associated gears can be so positioned on the usual parallel shafts as to allow considerable flexibility in adapting them to different vehicle space requirements. A considerable number of speed ratios can also be obtained with but minor changes to the transmission, while permitting a substantial number of similar parts to be used for manufacturing economy.

For example, the following United States countershaft transmission patents are of general interest to the art: U.S. Pat. No. 3,064,488 issued Nov. 20, 1962 to A. L. Lee et al; U.S. Pat. No. 3,080,767 issued Mar. 12, 1963 to S. J. Price, Jr.; U.S. Pat. No. 3,425,293 issued Feb. 4, 1969 to H. S. Krawczyk et al; U.S. Pat. No. 3,465,609 issued Sep. 9, 1969 to J. F. Fisher et al; U.S. Pat. No. 3,710,637 issued Jan. 16, 1973 to J. F. Fisher et al; U.S. Pat. No. 3,858,455 issued Jan. 7, 1975 to R. L. Sisson et al; U.S. Pat. No. 3,913,411 issued Oct. 21, 1975 to J. J. Jameson; and U.S. Pat. No. 4,341,127 issued Jul. 27, 1982 to E. Stodt.

While such countershaft transmissions have a considerable number of desirable features they are deficient in several other respects. One of the major problems with them is that if they are connected to the output member of the engine and/or optional torque converter assembly of the vehicle they require excessive space above the axis of the input shaft. Specifically, in some vehicular applications it would be necessary to raise the floor plates and elevate the entire operator station in order to obtain sufficient clearance above the input shaft's axis to accommodate large diameter components such as a rotating clutch. Another factor of significance is that some of these available transmissions have an excessive axial length and/or an excessive transverse width so that they cannot fit into the limited space available in a vehicle.

One type of countershaft transmission, such as that disclosed by U.S. Pat. No. 4,823,639 issued to Krause et al., and having an issue date of Apr. 25, 1989 provides a transmission structure facilitating a family of countershaft transmissions which lend to custom construction of each transmission to suit the particular usage and speed requirements specified for the vehicle.

However, it is common for a machine owner, having a machine employing one of the family of aforesaid transmissions, to require the machine to include more than one operational and speed range capability. For instance, a ground-engaging machine such as a wheel loader, for example, may require a low speed application such as mowing, and thereafter, require a high-speed application such as loading and transporting earth, rock, etc.

Known transmissions which include structure to accommodate disparate operational ranges typically include dog clutches or manual engaged gear meshes which require the vehicle, employing such a transmission, to be stopped or possess little if any speed when transitioning between operational ranges. For example, U.S. Pat. No. 3,916,714 issued to Sisson et al. and having and issue date of Nov. 4, 1975 discloses a sleeved shift-connecting member that is positionable between one of two positions. Accordingly, the selected gear assemblies, to provide the desired operational range, require to be intermeshed through the sleeve which, in turn, necessitates that the gears include negligible rotational speed to carry out the speed range shift.

Therefore, a countershaft transmission, of simple construct, which provides both a high range capability and a low range capability which significantly increases the versatility of the machine employing such a transmission, would be desirable. Furthermore, a transmission having dual range capabilities that may be shifted when the vehicle possesses a significant speed, would be desirable.

SUMMARY OF THE INVENTION

The present invention provides a countershaft transmission including an input member drivingly connected to a power source and at least one directional clutch assembly structured and arranged to be selectively engageable with the input member. At least one speed clutch assembly is structured and arranged to be selectively engageable with the at least one directional clutch assembly and a dual range assembly is structured and arranged to be selectively engageable with the at least one speed clutch assembly. An output member is selectively engageable with the dual range assembly wherein a rotational speed of the input member is transformed to one of a high range speed or a low range speed of the output member through the dual range assembly.

The present invention further provides a method of operating a transmission having a driven input member and an output member. The method includes driving the input member with a power source; causing the output member to rotate in a selectable direction through a directional clutch assembly engaged with the input member; causing the output member to rotate at a selectable speed through a speed clutch assembly engaged with the output member; and selectively urging the output member to rotate within one of a high speed range or a low speed range through a dual range assembly engaged with the output member.

BRIEF DESCRIPTION OF THE DRAWINGS

The above-mentioned and other features of this invention, and the manner of attaining them, will become more apparent and the invention itself will be better understood by reference to the following description of the embodiment of the invention taken in conjunction with the accompanying drawings, wherein:

FIG. 1 is a schematic representation of the countershaft transmission according to the present invention; and FIG. 2 is a speed chart for the transmission of FIG. 1, indicating the clutches which are engaged in each of the forward and reverse speeds for both the high and low transmission ranges and corresponding reduction ratios therefor.

DETAILED DESCRIPTION

Reference will now be made in detail to an exemplary embodiment of the invention, an example of which is illustrated in the accompanying drawings.

Referring to FIG. 1, there is shown a countershaft transmission 10 having a housing 12, and an input member 14 and an output member 16 rotatably supported in the housing along an input axis 18 and an output axis 20 respectively. In addition, first, second and third countershafts 22, 24 and 26 are rotatably mounted within the housing respectively along axes 28, 30 and 32 which are substantially parallel to each other and to the input and output axes 18, 20, respectively. In an exemplary embodiment the housing 12 may be constructed of two major pieces, or casing halves (not shown), as is customary.

Transmission 10 includes three directional clutch assemblies 34, 36, and 38 and three primary speed clutch assemblies 40, 42 and 44. A dual range assembly 46 provides two additional speed clutch assemblies, namely, a high range clutch assembly 48 and a low range clutch assembly 50.

The interconnection between the input member 14, directional clutch assemblies 34, 36 and the first countershaft 22 will now be described. A first gear 52 and a second gear 54 are centered and fixed to the input member 14. The term "fixed" may be understood as being integral with, permanently attached, interconnected through a splined connection or fused by welding, for example, or by any other means known to those having ordinary skill in the art. The first directional clutch assembly 34 includes a sleeve 60 such as a hollow member or roller bearing assembly, for example, which freely rotates about, and is supported by, the countershaft 22. A rotatable disc 58 is fixed to an end of the sleeve 60 and may be "clutched" or selectively retained by an engaging portion 62 which generally overlays the rotatable disc 58, as is customary. A gear 56 is fixed to the other end of the sleeve 60 and is in continuous mesh with the gear 52 of the input member 14. Upon engagement of the clutch assembly 34, the engaging portion 62 retains the rotatable disc 58, through movement of a known axially extending hydraulic piston assembly (not shown), for example. Since the engaging portion 62 of the clutch assembly 34 is attached to a gear 72 fixed to the first countershaft 22, the first countershaft 22 is urged to rotate with the gear 56 associated with the clutch assembly 34.

In an exemplary embodiment, the clutch assemblies are known hydraulically engaged and spring disengaged rotating clutch assemblies which may be selectively engaged to connect a particular gear to an associated countershaft for conjoint rotation thereof. In general, it is envisioned that one or more of the clutch assemblies provided within the countershaft transmission 10 may include a first plurality of annular plates and a second plurality of interleaved annular plates or friction discs connected respectively to a spline formed internally on a drum of a particular gear and a counterpart spline formed externally on a hub of the mating countershaft in a known manner.

The second directional clutch assembly 36 is positioned adjacent relative to the directional clutch assembly 34. The directional clutch assembly 36 includes a sleeve 68 rotatable about the first countershaft 22 and having a rotatable disc 66 attached to an end thereof. A gear 64 is fixed to the other end of the sleeve 68 and is in continuous mesh with the gear 54 of the input member 14. An engaging portion 70 overlays the rotatable disc 66 and is fixed to the gear 72. The gear 72 is fixed and centered upon the first countershaft 22. In an exemplary embodiment, the second directional clutch assembly 36 may be selectively engaged to cause a vehicle, employing the transmission 10, to move in a forward direction pursuant to a single speed (FIG. 2) for each of the high and low speed ranges. Alternatively, the first directional clutch assembly 34 may be selectively engaged to cause movement of the vehicle in the forward direction pursuant to three high-speeds (FIG. 2) for each of the high and low speed ranges.

The interconnection between the second countershaft 24 and the clutch assemblies 38 and 40 will now be described. The third directional clutch assembly 38 co-acts with a gear 76 which may be selectively meshed with the gear 52 of the input member 14 through a directional switching member 74 (dotted). For example, the switching member 74 may include an idler gear assembly selectively positionable and controlled through a shift lever to interconnect the gear 52 of the input member 14 with the gear 76, or alternatively, with the gear 56. Preferably, the switching member 74 may be configured to provide continuous and simultaneous meshing of both of the gears 56 and 76 with gear 52 of the input member 14.

The third directional clutch assembly 38 includes a sleeve 80 rotatable about the second countershaft 24 and having a rotatable disc 78 attached to an end of the sleeve 80. The gear 76 is fixed to the other end of the sleeve 80 and is in continuous mesh with the gear 52 of the input member 14. An engaging portion 82 overlays the rotatable disc 78 and is fixed to a gear 92. The gear 92 is fixed and centered upon the second countershaft 24 and is in continuous mesh with the gear 72 of the first countershaft 22. The third directional clutch assembly 38 may be selectively engaged to cause a vehicle, employing the transmission 10, to move in a reverse direction pursuant to three speed ranges (FIG. 2).

The first speed clutch assembly 40 co-acts with a gear 84, which is in continuous mesh with a gear 93 fixed and centered upon the third countershaft 26. The first speed clutch assembly 40 includes a sleeve 88, rotatable about the second countershaft 24, and a rotatable disc 86 attached to an end of the sleeve 88. The gear 84 is fixed to the other end of the sleeve 88. An engaging portion 90 overlays the rotatable disc 86 and is fixed to the gear 92. A gear 94 is fixed and centered upon the second countershaft 24 and is in continuous mesh with a gear 104 associated with the third speed clutch assembly 44. In an exemplary embodiment, the first speed clutch assembly 40 is the second gear speed selection for both forward and reverse speeds (See FIG. 2, 2F, 2R High and Low Range).

The interconnection between the third countershaft 26 and the speed clutch assemblies 42 and 44 will now be described. The second speed clutch assembly 42 co-acts with a gear 96 which is in continuous mesh with the gear 92 fixed and centered upon the second countershaft 24. The speed clutch assembly 42 includes a sleeve 100, rotatable about the third countershaft 26, and a rotatable disc 98 attached to an end of the sleeve 100. The gear 96 is fixed to the other end of the sleeve 100. An engaging portion 102 overlays the rotatable disc 98 and is attached to the gear 93. The gear 92 is fixed and centered upon the second countershaft 24 and is in continuous mesh with the gear 96 associated with the second speed clutch assembly 42. In an exemplary embodiment, the second speed clutch assembly 42 is the third gear speed selection for both forward and reverse speeds (See FIG. 2, 3F, 3R High and Low Range).

The third speed clutch assembly 44 co-acts with a gear 104 which is in continuous mesh with the gear 94 fixed and centered upon the second countershaft 24. The speed clutch assembly 44 includes a sleeve 108, rotatable about the third countershaft 26, and a rotatable disc 106 attached to an end of the sleeve 108. The gear 104 is fixed to the other end of the sleeve 108. An engaging portion 110 overlays the rotatable disc 106 and is attached to the gear 93. The gear 94 is fixed and centered upon the second countershaft 24 and is in continuous mesh with the gear 104 associated with the third speed clutch assembly 44. In an exemplary embodiment, the third speed clutch assembly 44 is the first gear speed selection for both forward and reverse speeds (See FIG. 2, 1F, 1R High and Low Range).

As hereinafter described in the "Industrial Applicability" section, a fourth gear speed selection (See FIG. 2, 4F High and Low Range) for the forward direction is available through simultaneous engagement of the second directional clutch 36 and the second speed clutch assembly 42.

The third countershaft 26 includes the first gear 93 and a second gear 112 centered and fixed to the third countershaft 26. The gear 112 is in continuous mesh with a gear 114 which is associated with the output member 16. Rather than the gear 114 being fixed to the output member 16, it is fixed to a sleeve 116, such as a hollow shaft or a roller bearing, for example. Moreover, both of the high and low range clutch assemblies 48, 50 of the dual range assembly 46 are attached to the sleeve 116 as hereinafter described. Hence, the sleeve 116 freely rotates relative to the output member 16 unless either the high range clutch assembly 48 or the low range clutch assembly 50 is engaged to cause conjoint rotation between the sleeve 116 and the output member 16.

The interconnection between the output member 16 and the dual range assembly 46 will now be described. The high range clutch assembly 48 includes a rotatable disc 118 fixed to an end 120 of the sleeve 116. An engaging portion 122 overlays the rotatable disc 118 and is fixed to the output member 16.

The low range clutch assembly 50 co-acts with a planetary assembly 124 to provide a suitably low range reduction for the transmission 10. The planetary assembly 124 includes a ring gear 126, a planetary gear set 128, a sun gear 130 and a carrier member 132 rotatably supporting each planetary gear of the planetary gear set 128 as is customary. The carrier member 132 is fixed to the output member 16 and the sun gear 130 is fixed to an end 133 of the sleeve 116. The ring gear 126 includes an external margin portion 135 which is in an interfacing and interposing relationship with an engaging portion 134 grounded to the housing 12. Upon engagement of the low range clutch assembly 50 the engaging portion 134 reacts with the external margin portion 135 of the ring gear 126 and as a result, the ring gear 126 becomes grounded with the engaging portion 134. Consequently, the rotational output of the gear 114, fixed to the sleeve 116, is directed to the output member 16 through the carrier member 132.

Referring to FIG. 2, for each speed selection is an indication of the corresponding clutches (directional and speed) engaged and the corresponding reduction ratio. It will be understood that the transmission 10, by way of compact and uncomplicated dual range assembly architecture, provides eight forward speeds and six reverse speeds having an insignificant overlap of reduction between the high and low ranges such that a vehicle employing the transmission 10 is capable of low speed, and additionally, high speed operation and maneuverability. Moreover, it will also be understood that the aforementioned clutch assemblies may be engaged/disengaged, and a successive shift completed, contemporaneously with significant movement of a vehicle employing the transmission 10.

INDUSTRIAL APPLICABILITY

Referring to FIG. 1, in operation, the countershaft transmission 10 includes the input member 14 being preferably driven by a power source such as an internal combustion engine and/or by the output member of an optional torque converter mechanism as is well known in the art, although not illustrated. Since the gears 52 and 54 are fixed to the input member 14, upon rotation of the input member, accordingly, the gears 52, 54 will be simultaneously driven. However, the gear 72 fixed to the first countershaft 22 will not be affected unless one of the first or second directional clutch assemblies 34, 36 are engaged.

If an operator selects a first forward speed within the low range (IF LOW), the operator generally controls the vehicle so as to cause the first directional clutch 34, the third speed clutch assembly 44 and the low range clutch assembly 50 of the dual range assembly 46 to be hydraulically actuated so as to engage the interleaved plates thereof together. This respectively connects the gear 56 with the first countershaft 22 resulting in conjoint rotation of the gear 72 and the first countershaft 22. In turn, gear 72 is intermeshed with gear 92 of the second countershaft 24 and since both gear 92 and gear 94 are fixed to the second countershaft 24, gear 94 drivingly intermeshes with gear 104 which is associated with the third speed clutch assembly 44 (first speed). The engaged clutch 44 causes conjoint rotation between the third countershaft 26 and the gear 104, which in turn cause rotation of gear 112 fixed to the third countershaft 26. The gear 112 is intermeshed with the gear 114 of the dual range assembly 46 and since the low range clutch assembly 50 is selectively engaged, the gear 114 drives the output member 16 at a speed accordingly reduced pursuant to the planetary assembly 124.

For example, if an operator selects the speed 1F Low, and if gears 52, 56, 72, 92, 94, 104, 112 and 114 respectively include 30, 39, 50, 50, 33, 93, 50 and 75 teeth, and the planetary assembly 46 includes a reduction ratio of 3.4 (sun 34 teeth, planet gears 24 teeth and the ring gear 82 teeth) then a vehicle having an engine RPM of 2000 may travel at approximately 1 MPH.

If an operator selects 1F High, the high range clutch assembly 48 is engaged and, as a result, the output of gear 114 is transmitted to the output member 16 through the high range clutch assembly 48. For example, a vehicle may travel approximately 3.6 MPH when the 1F High-speed selection is engaged.

As indicated by the speed chart of FIG. 2, it is only necessary to disengage the third speed clutch assembly 44 and to engage the first speed clutch assembly 40 in order to shift the transmission 10 from first to second forward speed (1F Low to 2F Low). In this mode, the speed reduction ratio is reduced and the output member is driven at a higher speed by way of gear pairs 52–56, 72–92, 84–93, 112–114 and 126–128–130 (planetary reduction). In an exemplary embodiment, if an operator selects 2F Low, for example, and gears 52, 56, 72, 92, 84, 93, 112, and 114 respectively include 30, 39, 50, 50, 38, 53, 50 and 75 teeth, the planetary assembly 46 includes a reduction ratio of 3.4 (sun 34 teeth, planet gears 24 teeth and the ring gear 82 teeth) and the vehicle includes an engine RPM of 2000, then the vehicle may include a travel speed of approximately 2.2 MPH.

If an operator selects 2F High, the first directional clutch assembly 34, the first speed clutch assembly 40 and the high range clutch 48 of the dual range assembly 46 are engaged. In this mode, the engaged gear pairs include 52–56, 72–92,

84–93 and 112–114. For example, in 2F High, the vehicle may travel approximately 7.4 MPH.

In order to shift from second to third speed forward (2F Low to 3F Low), the first speed clutch 40 is disengaged and the second speed clutch 42 is engaged. Hence, only one clutch need be engaged from first to second, or from second to third which is advantageous from both the torque loading and control standpoints. In third gear forward, in the low range, the drive is by way of gear pairs 52–56, 72–92, 92–96, 112–114 and 126–128–130. For example, in 3F Low and assuming the respective gears may have teeth as specified hereinabove with the addition of gear 96 including 40 teeth, then the vehicle having an engine speed of 2000 RPM may include a travel speed of approximately 3.8 MPH.

Moreover, similar to the shift from 2F Low to 3F Low, the shift from 2F High to 3F High requires the first speed clutch 40 be disengaged and the second speed clutch 42 be engaged. Specifically, if an operator selects 3F High, the first directional clutch assembly 34, the second speed clutch assembly 42 and the high range clutch 48 of the dual range assembly 46 are engaged. In this mode, the engaged gear pairs include 52–56, 72–92, 92–96 and 112–114. For example, in 3F High and assuming the respective gears may have teeth as specified hereinabove, then the vehicle having an engine speed of 2000 RPM may include a travel speed of approximately 12.8 MPH.

In order to shift from third to fourth speed forward (3F Low to 4F Low), the first directional clutch 34 is disengaged and the second directional clutch 36 is engaged. Hence, only one clutch need be engaged from first to second, second to third or from third to fourth. In fourth gear forward, in the low range, the drive is by way of gear pairs 54–64, 72–92, 92–96, 112–114 and 126–128–130. For example, in 4F Low and assuming the respective gears may have teeth as specified hereinabove with the addition of gears 54 and 64 including 48 and 32 teeth, respectively, then the vehicle having an engine speed of 2000 RPM may include a travel speed of approximately 7.3 MPH.

Moreover, similar to the shift from 3F Low to 4F Low, the shift from 3F High to 4F High requires the first directional clutch 34 to be disengaged and the second directional clutch 36 to be engaged. Specifically, if an operator selects 4F High, the second directional clutch assembly 36, the second speed clutch assembly 42 and the high range clutch 48 of the dual range assembly 46 are engaged. In this mode, the engaged gear pairs include 54–64, 72–92, 92–96 and 112–114. For example, in 4F High and assuming the respective gears may have teeth as specified hereinabove, then the vehicle having an engine speed of 2000 RPM may include a travel speed of approximately 25 MPH.

In first reverse (1R Low), as shown by the chart of FIG. 2, the third speed clutch assembly 44 is engaged as it is in first forward (1F Low). However, in the reverse mode of operation the third directional clutch assembly 38 is always engaged. If an operator selects 1R Low, the third directional clutch assembly 38, the third speed clutch assembly 44 and the low range clutch 50 of the dual range assembly 46 are engaged. In this mode, the engaged gear pairs include 52–76, 94–104, 112–114 and 126–128–130. For example, in 1R Low and assuming the respective gears may have teeth as specified hereinabove with the addition of gear 76 including 39 teeth, then the vehicle having an engine speed of 2000 RPM may include a travel speed of approximately 1 MPH.

If an operator selects 1R High, the third directional clutch assembly 38, the third speed clutch assembly 44 and the high range clutch 48 of the dual range assembly 46 are engaged. In this mode, the engaged gear pairs include 52–76, 94–104 and 112–114. For example, in 1R High and assuming the respective gears having teeth as specified hereinabove, the vehicle may travel approximately 3.6 MPH corresponding to an engine speed of 2000 RPM.

In order to shift from first to second speed reverse (1R Low to 2R Low), the third speed clutch assembly 44 is disengaged and the first speed clutch assembly 40 is engaged. Hence, only one clutch need be engaged from first to second. In second gear reverse, in the low range, the drive is by way of gear pairs 52–76, 84–93, 112–114 and 126–128–130. For example, in 2R Low and assuming the respective gears may have teeth as specified hereinabove, then the vehicle having an engine speed of 2000 RPM may include a travel speed of approximately 2.2 MPH.

Moreover, similar to the shift from 1R Low to 2R Low, the shift from 1R High to 2R High requires the third speed clutch assembly 44 be disengaged and the first speed clutch assembly 40 to be engaged. Specifically, if an operator selects 2R High, the third directional clutch assembly 38, the first speed clutch assembly 40 and the high range clutch 48 of the dual range assembly 46 are engaged. In this mode, the engaged gear pairs include 52–76, 84–93 and 112–114. For example, in 2R High and assuming the respective gears may have teeth as specified hereinabove, then the vehicle having an engine speed of 2000 RPM may include a travel speed of approximately 7.4 MPH.

To achieve third reverse (3R Low) from 2R Low, the first speed clutch assembly 40 is disengaged and the second speed clutch assembly 42 is engaged.

Output member 16 is driven by gear pairs 52–76, 92–96, 112–114 and 126–128–130. In an exemplary embodiment and assuming the respective gears may include teeth as specified above, then the vehicle having an engine speed of 2000 RPM may include a travel speed of approximately 3.8 MPH.

Lastly, to shift to third speed reverse high range from second speed reverse high range, the first speed clutch assembly 40 is disengaged while the second speed clutch assembly 42 is engaged. Again, as in forward, it is only necessary to engage a single clutch to change reverse speeds. Torque is transmitted in third speed reverse through gear pairs 52–76, 92–96 and 112–114 to the output member 16. In an exemplary embodiment, with the gear teeth and engine RPM as specified above the vehicle speed may be, for example, 12.8 MPH.

Notably, it will be understood that since, generally, only one clutch need be engaged to achieve the incremental shift, then the vehicle need not be significantly slowed or stopped to perform such a shift. Furthermore, since the transmission 10 includes only interleaved clutch assemblies to transfer torque between the input and output members, consequently shift transitioning when the vehicle is in motion is accommodated without significant wear or premature damage to the gear, clutch and countershaft assemblies.

Other aspects, objects and advantages of this invention can be obtained from a study of the drawings, the disclosure and the appended claims.

What is claimed is:

1. A countershaft transmission for use with a power source, the countershaft transmission comprising:
    an input member driveably connected to the power source;
    at least one directional clutch assembly structured and arranged to be selectively engageable with the input member;

at least one speed clutch assembly structured and arranged to be selectively engageable with the at least one directional clutch assembly;

a dual range assembly structured and arranged to be selectively engageable with the at least one speed clutch assembly; and an output member selectively engageable with the dual range assembly, wherein a rotational speed of the input member is transformed to a rotational speed of the output member through the dual range assembly, the rotational speed of the output member being one of a plurality of first speeds within a high speed range or one of a plurality of second speeds within a low speed range, wherein the countershaft transmission is configured such that, in response to an incremental speed selection of the output member, only one of the at least one directional clutch assembly or only one of the at least one speed clutch assembly is modified to cause a change in the speed of the output member between all consecutive speeds within the high speed range or within the low speed range.

2. The countershaft transmission of claim 1, wherein the at least one speed clutch assembly and the dual range assembly are selectively changeable independent of a rotational status of the input member.

3. The countershaft transmission of claim 1, wherein the dual range assembly is positioned to directly engage with the output member.

4. The countershaft transmission of claim 1, wherein the incremental speed selection of the output member is within the high speed range.

5. The countershaft transmission of claim 1, wherein the incremental speed selection of the output member is within the low speed range.

6. A method of operating a transmission for use with a power source, the transmission having a driven input member and an output member, the method comprising:

driving the input member with the power source;

causing the output member to rotate in a selectable direction through a directional clutch assembly engaged with the input member;

causing the output member to rotate at a selectable speed through a speed clutch assembly engaged with the output member; and selectively urging the output member to rotate within one of a plurality of first speeds within a high speed range or one of a plurality of second speeds within a low speed range through a dual range assembly engaged with the output member, wherein only one of the at least one directional clutch assembly or only one of the at least one speed clutch assembly is modified to cause a change in the speed of the output member between all consecutive speeds within the high speed range or within the low speeds range in response to an incremental speed selection of the output member.

7. The method of claim 6, further comprising: placing the dual range assembly between one of the plurality of first and second speeds and one of the other of the plurality of first and second speeds independent of the speed of the output member.

8. The method of claim 6, wherein the incremental speed selection of the output member is within the high speed range.

9. The method of claim 6, wherein the incremental speed selection of the output member is within the low speed range.

* * * * *